J. C. F. McCAULEY.
HEADER.
APPLICATION FILED AUG. 7, 1916.
1,216,585.
Patented Feb. 20, 1917.
2 SHEETS—SHEET 2.
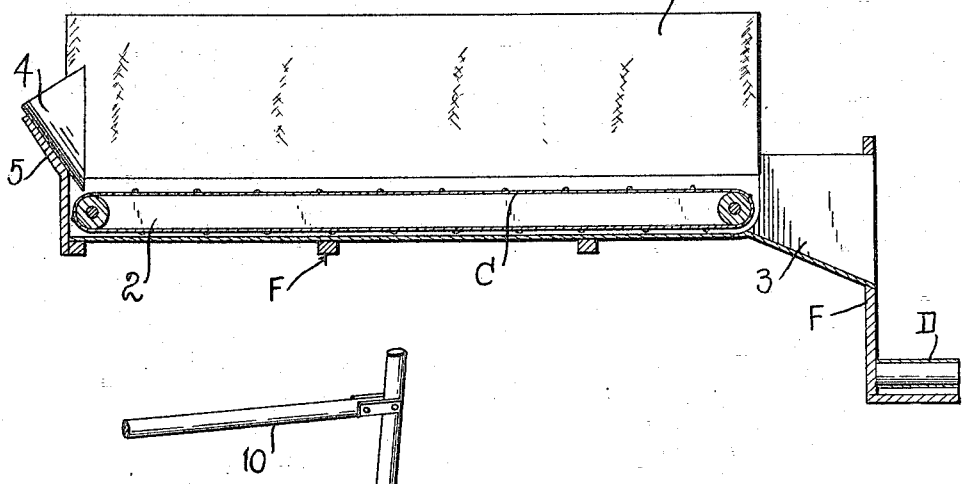
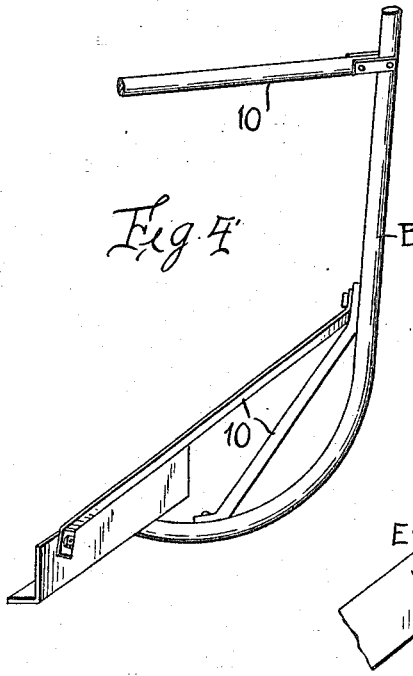
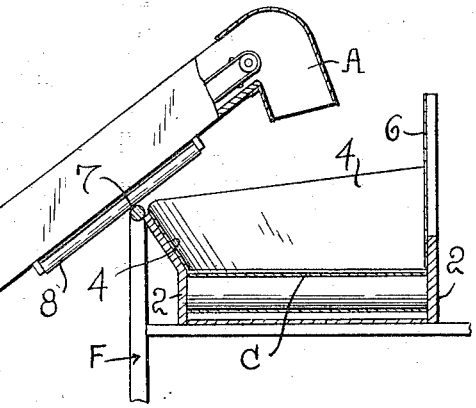
Inventor
JOHN C. F. McCAULEY

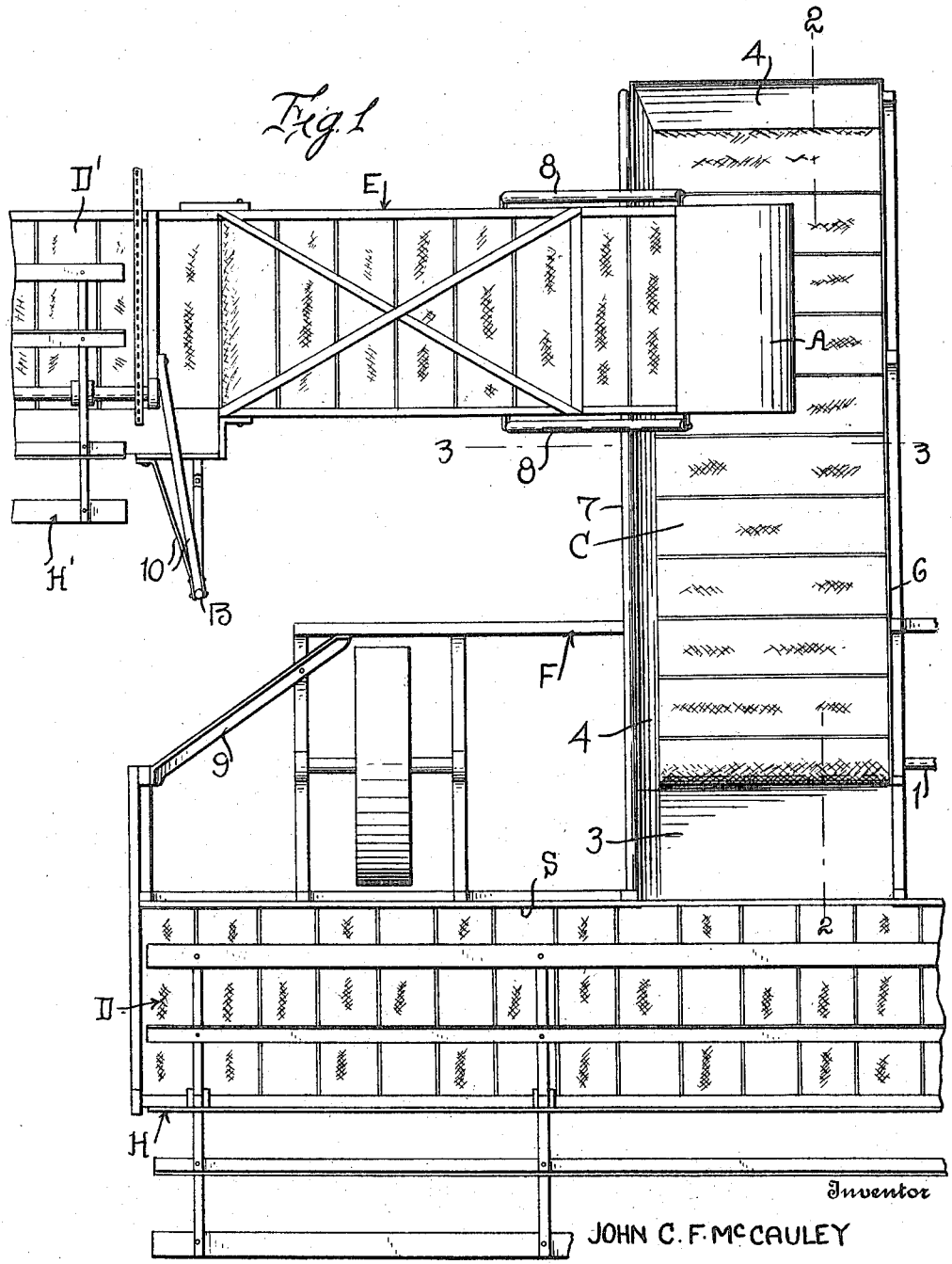

UNITED STATES PATENT OFFICE.

JOHN C. F. McCAULEY, OF FOWLER, KANSAS.

HEADER.

1,216,585.  Specification of Letters Patent.  Patented Feb. 20, 1917.

Application filed August 7, 1916. Serial No. 113,572.

*To all whom it may concern:*

Be it known that I, JOHN C. F. MCCAULEY, a citizen of the United States, residing at Fowler, in the county of Meade and State of Kansas, have invented certain new and useful Improvements in Headers, of which the following is a specification, reference being had to the accompanying drawings.

This invention relates to certain improvements in harvesters and has relation more particularly to a combined harvester and thresher and wherein the harvesting mechanism constitutes a header; and it is an object of the invention to provide novel and improved means whereby a supplemental or extra swath may be cut and delivered to the main draper or carrying belt.

It is also an object of the invention to provide a supplemental header having novel and improved means whereby it may be effectively operated in connection with the main heading mechanism together with means whereby the grain collected by said supplemental header may be conveyed or delivered to the draper or carrying belt of the main header.

The invention also has for an object to provide a novel and improved arrangement of parts whereby a supplemental header may be employed in connection with a main header and wherein said supplemental header is operated independently of the main header together with means whereby the headers are protected against injury one by the other when in coöperating relation.

The invention consists in the details of construction and in the combination and arrangement of the several parts of my improved harvester whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a fragmentary top plan view illustrating a main header and a supplemental header constructed in accordance with an embodiment of my invention;

Fig. 2 is a sectional view taken substantially on the line 2—2 of Fig. 1;

Fig. 3 is a sectional view taken substantially on the line 3—3 of Fig. 1; and

Fig. 4 is a fragmentary view in perspective illustrating the bumper herein embodied and carried by the supplemental header.

As disclosed in the accompanying drawings, F denotes the frame of a main header H which includes a grain platform which carries the draper or carrying belt D, the same being of any well known construction and which is generally employed in connection with a threshing machine (not illustrated). The portion of the frame F rearwardly of the back shield or screen S supports the endless conveyer C adapted to be suitably driven, as indicated at 1, from a movable part of the header H or the threshing machine or in any manner which best suits the requirements of practice and said conveyer C extends throughout its length in the same direction as the direction of travel of the header.

The conveyer C travels between the side boards 2 and delivers within the chute 3 discharging upon the draper or carrying belt D. Said endless conveyer C is preferably positioned at a point substantially midway of the header H. The outer side board 2 is provided with the inwardly disposed apron 4 as is also the rear end board 5 so that the grain discharged from the supplemental header H' may be properly delivered upon the conveyer C. The second or inner side board 2 is preferably provided with the upstanding guard or shield 6 of canvas or other suitable material for a purpose which is believed to be self-evident.

The header H' is of conventional construction and is adapted to be operated independently of the header H preferably by draft animals and in a well known manner, and the draper or carrying belt D' of the header H' delivers upon the elevating mechanism E and when the header H' is in assembled relation relative to the header H' the elevating mechanism E discharges upon the conveyer C hereinbefore referred to, and in order to facilitate such discharge the upper or outer end of the elevating mechanism E is provided with the downwardly extended hood or chute A so that the possibility of any of the grain becoming indiscriminately scattered or lost is lessened.

Disposed along the upper marginal portion of the outer side board 2 is a rail or rod 7 preferably of metal and circular in cross section and with which is adapted to contact the rollers 8 carried by and positioned beneath the opposite sides of the elevating mechanism E so that any relative independent movement of the headers H and H' when in assembled or coöperative relation will not result in injury to either the conveyer C or the elevating mechanism E.

I have also found it of particular import to provide the outer portion of the frame F with the inwardly disposed stop or arm 9 preferably of metal and with which the bumper B carried by the inner end portion of the header H' is adapted to contact so that the headers H and H' are protected against injury should the header H' be caused to advance sufficiently as to come into contact with the header H.

As herein embodied, the bumper B comprises an elongated metallic rod secured to the inner end of the forward marginal portion of the header H' and disposed upwardly on a predetermined curvature, and bracing said bumper B is a plurality of brace rods 10 interposed between the bumper and various parts of the header H' as the construction of the header H' permits.

From the foregoing description, it is thought to be obvious that a header constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

In combination, a header including a grain platform, a draper carried by the platform and traveling in a path at right angles to the direction of travel of the header, a conveyer carried by the header rearwardly of the draper and discharging upon the draper substantially midway the length of the draper, said conveyer being extended throughout its length in substantially the same general direction as the direction of travel of the header, and a second header operated independently of the first named header and provided with a header elevator discharging upon the conveyer of the first named header.

In testimony whereof I hereunto affix my signature in the presence of two witnesses.

JOHN C. F. McCAULEY.

Witnesses:
J. F. SWEET,
M. L. MORRISON.

Copies of this patent may be obtained for five cents each, by addressing the "Commissioner of Patents, Washington, D. C."